US011097581B2

(12) United States Patent
Lai et al.

(10) Patent No.: US 11,097,581 B2
(45) Date of Patent: Aug. 24, 2021

(54) QUICK DISASSEMBLY TOOL

(71) Applicant: Zhejiang CFMOTO Power Co., Ltd., Hangzhou (CN)

(72) Inventors: Minjie Lai, Hangzhou (CN); Zhangping Yuan, Hangzhou (CN); Zhiyong Chen, Hangzhou (CN); Guoyong Ren, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 719 days.

(21) Appl. No.: 15/962,112

(22) Filed: Apr. 25, 2018

(65) Prior Publication Data

US 2019/0241034 A1 Aug. 8, 2019

(30) Foreign Application Priority Data

Feb. 8, 2018 (CN) ......................... 201810126609.1

(51) Int. Cl.
*B60D 1/50* (2006.01)
*B60D 1/18* (2006.01)
(Continued)

(52) U.S. Cl.
CPC ............... *B60D 1/50* (2013.01); *B60D 1/187* (2013.01); *B60D 1/40* (2013.01); *B60D 1/58* (2013.01);
(Continued)

(58) Field of Classification Search
CPC .......... F16B 5/0092; F16B 21/04; F16B 5/10; B60D 2001/008; B60D 1/187; B60D 1/50;
(Continued)

(56) References Cited

U.S. PATENT DOCUMENTS 2,486,411 A * 11/1949 Huelster .................. F16B 5/10 411/551
2,547,616 A 4/1951 Beekman
(Continued)

FOREIGN PATENT DOCUMENTS

JP 2015-218814 A 12/2015

OTHER PUBLICATIONS

Office Action for Australian Application No. 2018202853, dated Mar. 13, 2019.

*Primary Examiner* — Matthew R McMahon
(74) *Attorney, Agent, or Firm* — Wolf, Greenfield & Sacks, P.C.

(57) ABSTRACT

A quick disassembly tool for fixedly mounting a connection module is provided according to the present application, including a pressing block and a fixing block for press-fitting the connection module. A press-fitting end face of the fixing block is provided with a press-fitting hole, and a press-fitting post inserted into the press-fitting hole protrudes from the pressing block; the quick disassembly tool further includes a locking device respectively pressing on an end of the pressing block and an end of the fixing block, and the locking device includes an elastic pressing device configured to adjust a press-fitting space between the pressing block and the fixing block. The pressing block and the fixing block are connected and transversely position-limited through the press-fitting hole and the press-fitting post, the locking of the pressing block and the fixing block in a pressing direction is achieved by a locking device.

9 Claims, 4 Drawing Sheets

(51) Int. Cl.

| | |
|---|---|
| ***B60D 1/40*** | (2006.01) |
| ***B60D 1/58*** | (2006.01) |
| ***F16B 5/10*** | (2006.01) |
| *A01B 59/041* | (2006.01) |
| *B60D 1/00* | (2006.01) |
| *B62K 5/01* | (2013.01) |

(52) U.S. Cl.

CPC .............. *F16B 5/10* (2013.01); *A01B 59/041* (2013.01); *B60D 2001/008* (2013.01); *B62K 5/01* (2013.01)

(58) Field of Classification Search

CPC .......... B60D 1/40; B60D 1/58; A01B 59/041; B62K 5/01

See application file for complete search history.

(56) References Cited

U.S. PATENT DOCUMENTS

| | | | | |
|---|---|---|---|---|
| 2,922,211 | A * | 1/1960 | Boyd | F16B 5/10 411/551 |
| 2,975,667 | A * | 3/1961 | Bross | F16B 5/10 411/521 |
| 3,125,922 | A * | 3/1964 | Sauter | F16B 21/186 403/408.1 |
| 5,175,963 | A | 1/1993 | Schäfer et al. | |
| 5,779,422 | A * | 7/1998 | Petignat | B26B 13/285 411/551 |
| 7,666,070 | B2 * | 2/2010 | Weber | B23B 31/4073 451/342 |
| 7,874,779 | B2 * | 1/2011 | Csik | F16B 5/0208 411/553 |
| 9,522,583 | B2 * | 12/2016 | McCoy | B60D 1/28 |
| 10,266,994 | B2 * | 4/2019 | McDowell | E01C 5/005 |
| 10,539,172 | B2 * | 1/2020 | Bowers | F16B 21/04 |
| 2008/0017007 | A1 | 1/2008 | Weber et al. | |
| 2009/0280673 | A1 | 11/2009 | Kohen | |

* cited by examiner

QUICK DISASSEMBLY TOOL

CROSS-REFERENCE TO RELATED APPLICATIONS

The present application claims the priority to Chinese patent application No. 201810126609.1 titled "QUICK DISASSEMBLY TOOL", and filed with the Chinese State Intellectual Property Office on Feb. 8, 2018, the entire disclosure of which is incorporated herein by reference.

FIELD

The present application relates to the technical field of four-wheeled off-road vehicles, and more particularly relates to a quick disassembly tool.

BACKGROUND

ATVs (All-Terrain Vehicles) and UTVs (Utility Vehicles) are four-wheeled cross-country vehicles and widely used in Europe and the United States for entertainment, transportation, and freight transport. By considering different functions of the vehicles, different designs are made at the beginning of designing.

For example, when farm implements such as containers, buckets, and rakes are used in farming, such implements can be conveniently assembled on vehicle models for transportation and entertainment, dragged by the ATVs or UTVs to work, and conveniently disassembled from the vehicles when not in use. By assembly and disassembly between different implements and vehicles, versatility of the vehicle models is enhanced.

When the ATVs or the UTVs are connected to tools or farm implements of different purposes, connection tools are specifically designed for the assembly and disassembly, which facilitates the users, enhances functions of the vehicles, and reduces the costs.

However, the conventional connection tool has a complicated structure, and multiple components are required to be connected, making the assembly and disassembly difficult.

Therefore, a technical issue to be addressed by those skilled in the art is to reduce structural complexity of a vehicle connection tool.

SUMMARY

In view of this, a quick disassembly tool is provided according to the present application, which reduces structural complexity of a vehicle connection tool.

A technical solution according to the present application is provided as follows:

a quick disassembly tool for fixedly mounting a connection module, including a pressing block and a fixing block for press-fitting the connection module, wherein a press-fitting end face of the fixing block is provided with a press-fitting hole, and a press-fitting post inserted into the press-fitting hole protrudes from the pressing block; the quick disassembly tool further includes a locking device respectively pressing on an end of the pressing block and an end of the fixing block, and the locking device includes an elastic pressing device configured to adjust a press-fitting space between the pressing block and the fixing block.

Preferably, in the quick disassembly tool, the pressing block includes a pressing disc lapped on the press-fitting end face of the fixing block and a press-fitting post protruding from a middle portion of the pressing disc, the connection module includes a fixing plate press-connected between the pressing block and the fixing block, and the fixing plate is provided with a pressing opening cooperating with the press-fitting post by insert fitting.

Preferably, in the quick disassembly tool, the locking device includes a torsion handle press-fitted on an end portion of the pressing block, and a torsion rod protruding from the press-fitting post is arranged on the torsion handle;

an end portion of the fixing block is provided with a position-limiting block fixedly connected with the torsion rod and pressing the fixing block tightly;

and the torsion rod is sheathed with a press-fitting spring abutting against the pressing block or the fixing block.

Preferably, in the quick disassembly tool, the position-limiting block includes a position-limiting post and a position-limiting ear extending in a radial direction of the position-limiting post, and a locking end of the fixing block is provided with a position-limiting hole rotationally cooperated with the position-limiting post;

a mounting channel in communication with both the press-fitting hole and the position-limiting hole, and passing through the position-limiting ear is provided in the fixing block.

Preferably, in the quick disassembly tool, a first end of the position-limiting post is provided with a mounting hole of the torsion rod to connect to the torsion rod, and a second end of the position-limiting post is provided with a locking bolt connected to the torsion rod.

Preferably, in the quick disassembly tool, a guide channel arranged in a press-fitting direction of the pressing block is provided in the pressing block, the torsion rod includes a first guide portion and a second guide portion having an inner diameter stepwise enlarged from an end portion to a root portion of the torsion rod, and the guide channel includes a first guide hole and a second guide hole configured for guiding the sliding of the first guide portion and the second guide portion; the press-fitting spring is sheathed on the first guide portion, and two ends of the press-fitting spring abut against a hole side wall of the first guide hole and the second guide portion respectively.

Preferably, in the quick disassembly tool, an outer wall of the position-limiting post is provided with a position-limiting groove arranged circumferentially around the position-limiting post, the position-limiting groove includes a position-limiting start point where it is a start in a loading-in direction of the position-limiting block and a position-limiting stop point where it is an end in a rotationally locking direction;

the press-fitting end face of the pressing block is provided with a position-stopping post protruding into the position-limiting groove.

Preferably, in the quick disassembly tool, an inner wall of the position-limiting groove is provided with an anti-rebound position-limiting slot near the position-limiting stop point for clamping the position-stopping post.

Preferably, in the quick disassembly tool, a rotation angle between the position-limiting start point and the position-limiting stop point is in a range of 0~90°.

Preferably, in the quick disassembly tool, a clearance between a root portion, located at the torsion rod, of the torsion handle and a locking end face of the pressing block is larger than 4 mm.

A quick disassembly tool configured to fixedly mount a connection module is provided according to the present application, including a pressing block and a fixing block for press-fitting the connection module, a press-fitting end face of the fixing block is provided with a press-fitting hole, and a press-fitting post inserted into the press-fitting hole protrudes from the pressing block; the quick disassembly tool further includes a locking device respectively pressing on an end of the pressing block and an end of the fixing block, and the locking device includes an elastic pressing device configured to adjust a press-fitting space between the pressing block and the fixing block. The pressing block and the fixing block are connected and transversely position-limited through the press-fitting hole and the press-fitting post, the connection module is pressed between the pressing block and the fixing block, and dragged after being pressed by the pressing block and the fixing block through the limitation in a pressing direction. The locking of the pressing block and the fixing block in the pressing direction is achieved by a locking device, and meanwhile, the adjustment of a press-fitting space between the pressing block and the fixing block is achieved by an elastic pressing device, thus, on the one hand, can adapt to the connection modules having different thicknesses, on the other hand, improves an elastic pressing force between the pressing block and the fixing block during a dragging process. In a case that the connection module is not press-fitted, the elastic pressing device can provide a locking force when the pressing block and the fixing block are unloaded, thereby improving the convenience of the quick disassembly tool in use.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAIL DESCRIPTION

A quick disassembly tool is provided according to the present application, which reduces structural complexity of a vehicle connection tool.

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of the present application.

Figure 1:
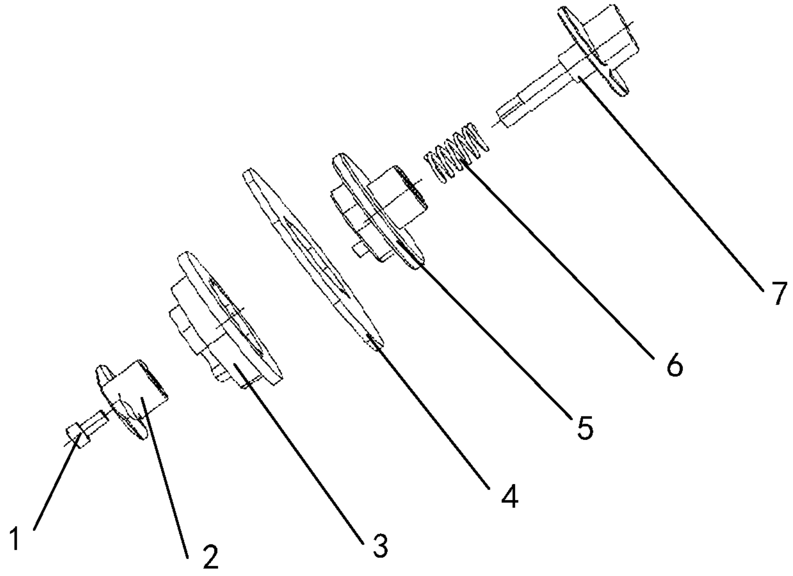
FIG. 1 is an exploded view showing a quick disassembly tool according to the present application.
Figure 2:
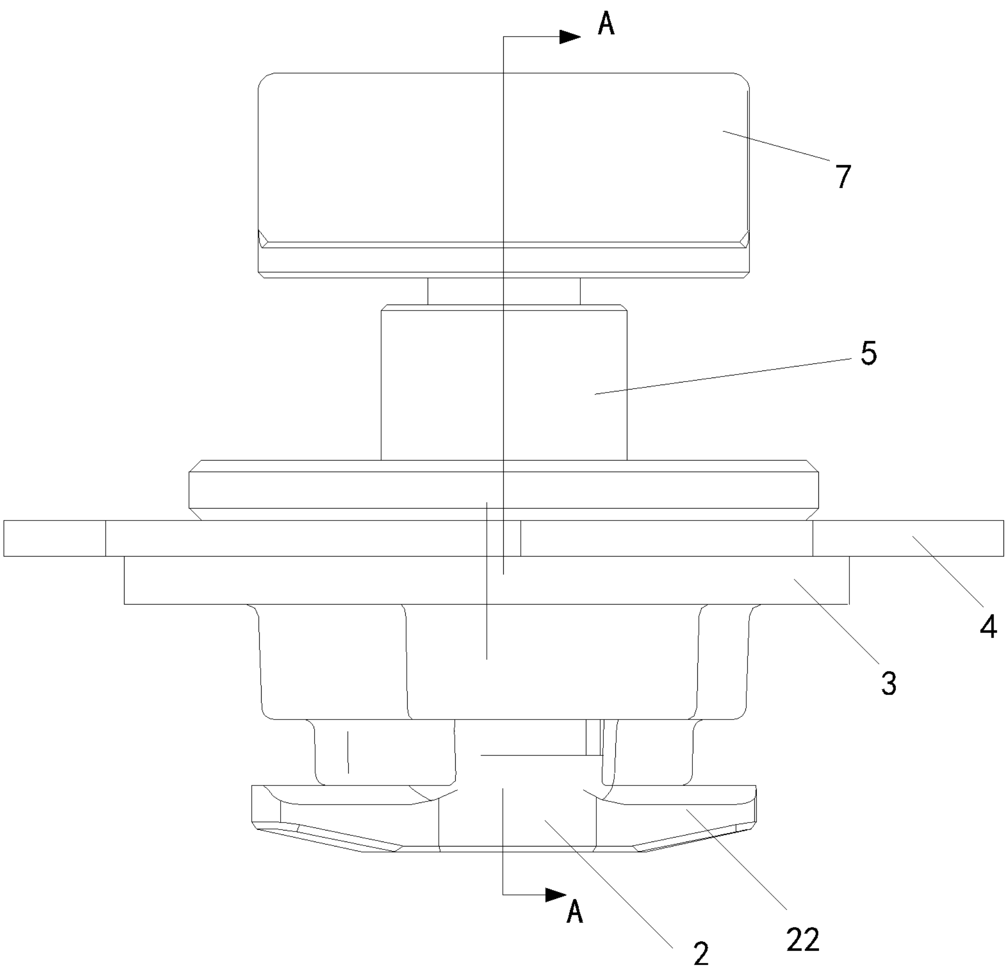
FIG. 2 is an assembly view showing the quick disassembly tool according to the present application.
Figure 3:
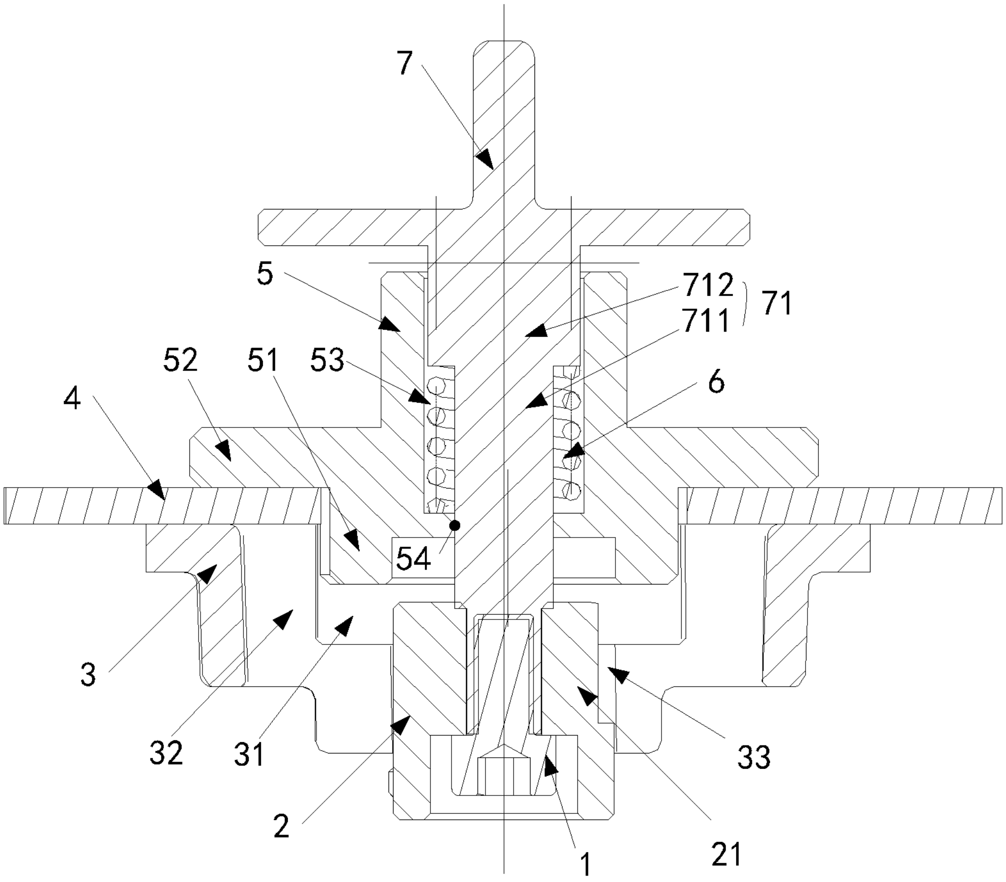
FIG. 3 is a sectional view in a direction A-A in FIG. 2.
Figure 4:
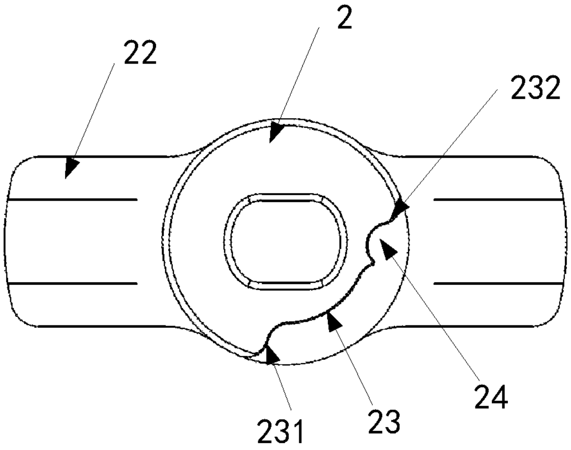
FIG. 4 is a top view showing a position-limiting block in FIG. 1.
Figure 5:
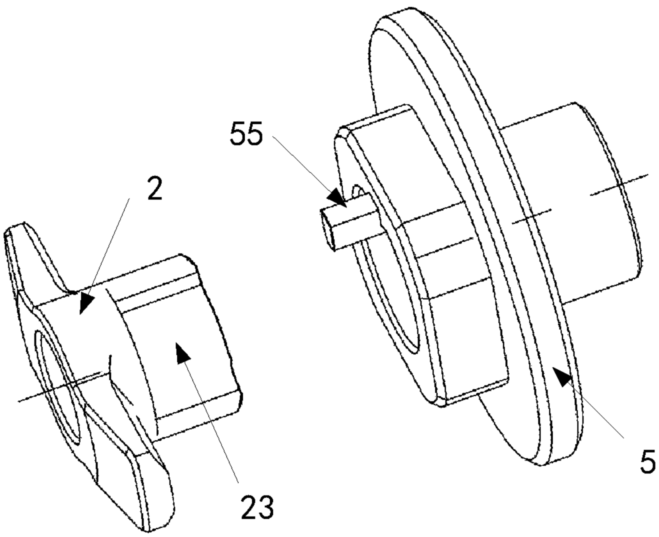
FIG. 5 is a schematic view showing an assembly relationship between the position-limiting block in FIG. 1 and a pressing block.

Referring to FIGS. 1 to 5, FIG. 1 is an exploded view showing a quick disassembly tool according to the present application; FIG. 2 is an assembly view showing the quick disassembly tool according to the present application; FIG. 3 is a sectional view in an direction A-A in FIG. 2; FIG. 4 is a top view showing a position-limiting block in FIG. 1; and FIG. 5 is a schematic view showing an assembly relationship between the position-limiting block in FIG. 1 and a pressing block.

A quick disassembly tool is provided according to the present application for fixedly mounting a connection module 4. The quick disassembly tool includes a pressing block 5 and a fixing block 3 for press-fitting the connection module 4. A press-fitting end face of the fixing block 3 is provided with a press-fitting hole 31, and a press-fitting post 51 for being inserted into the press-fitting hole 31 protrudes from the pressing block 5. The quick disassembly tool further includes a locking device respectively pressing on an end of the pressing block 5 and an end of the fixing block 3, and the locking device includes an elastic pressing device configured to adjust a press-fitting space between the pressing block 5 and the fixing block 3. The pressing block 5 and the fixing block 3 are connected and transversely position-limited through the press-fitting hole 31 and the press-fitting post 51, and the connection module 4 is pressed between the pressing block 5 and the fixing block 3 and dragged after being pressed by the pressing block 5 and the fixing block 3 through the limitation in a pressing direction. The locking of the pressing block 5 and the fixing block 3 in the pressing direction is achieved by a locking device, and meanwhile, the adjustment of a press-fitting space between the pressing block 5 and the fixing block 3 is achieved by the elastic pressing device, which, on the one hand, can adapt to the connection modules having different thicknesses, on the other hand, improves an elastic pressing force between the pressing block 5 and the fixing block 3 during a dragging process. In the case that the connection module 4 is not press-fitted, the elastic pressing device can provide a locking force when the pressing block 5 and the fixing block 3 are unloaded, thereby improving the convenience of the quick disassembly tool in use.

In ATV and UTV models, when an agricultural implement or other tool is loaded, the connection module 4 is provided with a connection portion connected with a vehicle body and another connection portion connected with the quick disassembly tool, and the connection portion may be arranged as a plate-like structure, and a connection opening clamp-fitted on the press-fitting hole 31 and the press-fitting post 51 is provided on the connection portion. The quick disassembly tool mainly provides a transverse dragging force, and in a press-fitting direction, mainly provides pressing in vibration during vehicle running, at the same time, the press-fitting post 51 plays a role of dragging the connecting module through the press-fitting post 51 and the press-fitting hole 31.

Specifically, the pressing block 5 includes a pressing disc 52 lapped on the press-fitting end face of the fixing block 3 and a press-fitting post 51 protruding from a middle portion of the pressing disc 52. The connection module 4 includes a fixing plate press-connected between the pressing block 5 and the fixing block 3. The fixing plate is provided with a pressing opening cooperating with the press-fitting post 51 by insert fitting. A press-fitting end of the pressing block 5 is in insert fitting cooperation with the press-fitting hole 31 through the press-fitting post 51, and at the same time, the pressing block 5 presses the connection module 4 between the pressing block 5 and the fixing block 3, and the pressing block 5 fits against the pressing end face of the fixed block 3 through the pressing disc 52. The press-fitting post 51 is located in the middle portion of the pressing disc 52, and the connection module 4 is supported by the pressing disc 52 and the pressing end face of the fixed block 3. The connection module 4 is press-fitted between the pressing block 5 and the fixing block 3 through the fixing plate. The fixing plate is a plate-like structure, and the pressing opening is opened and the fixing plate. The pressing opening has a same structure as the pressing hole, which ensures the structural stability of the connection structure that the fixing plate being between the pressing block and the fixing block.

In a specific embodiment of the present application, the locking device includes a torsion handle 7 press-fitted on an end portion of the pressing block 5, and a torsion rod 71 protruding from the press-fitting post 51 is arranged on the torsion handle 7. An end portion of the fixing block 5 is provided with a position-limiting block 2 fixedly connected with the torsion rod 71 and pressing the fixing block 3. The torsion rod 71 is sheathed with a press-fitting spring 6 abutting against the pressing block 5 or the fixing block 3.

The locking device is configured for locking and fixing the pressing block 5 and the fixing block 3, which avoids the separation of the pressing block and the fixing block caused by the vibration during the vehicle running. The locking device may be sleeved on an outer side of the pressing block 5 and the fixing block 3, or may be located at a middle portion in the press-fitting direction of the pressing block 5 and the fixing block 3.

In this embodiment, the locking device is press-fitted to the end portion of the pressing block 5 through the torsion handle 7. The torsion handle 7 protrudes from an extension end of the pressing post 51 through the torsion rod 71. An end portion of the torsion rod 71 is connected to the position-limiting block 2, the position-limiting block 2 protrudes from a locking end of the fixing block 3, and the end of the pressing block 5 and another end of the fixing block 3 are pressed by the torsion handle 7 and the position-limiting block 2.

The torsion rod 71 is sheathed with the press-fitting spring 6. The press-fitting spring 6 is compressed in an axial direction of the torsion rod 71, and the press-fitting spring 6 is arranged to abut against a locking end of the pressing block 5 or the locking end of the fixing block 3. When the press-fitting spring 6 abuts against the pressing block 5, the press-fitting spring 6 is supported by a root portion of the torsion handle 7, and the press-fitting spring 6 provides the pressing block 5 with a pressing force for pressing on the fixing block 3. When the press-fitting spring 6 abuts against the fixing block 3, the press-fitting spring 6 is supported by the position-limiting block 2, and the press-fitting spring 6 provides an acting force for pressing the fixing block 3 and the pressing block 5 tightly.

In a specific embodiment of the present application, the position-limiting block 2 includes a position-limiting post 21 and a position-limiting ear 22 extending in a radial direction of the position-limiting post 21. The locking end of the fixing block 3 is provided with a position-limiting hole rotationally cooperated with the position-limiting post 21. A mounting channel 32 in communication with both the press-fitting hole 31 and the position-limiting hole and passing through the position-limiting ear 22 is provided in the fixing block 3. After the pressing block 5 and the fixing block are pressed tightly, the end of the pressing block 5 and another end of the fixing block are required to be locked by the torsion handle 7 and the position-limiting block 2.

In order to improve the operating convenience of the quick disassembly tool, the position-limiting block 2 is arranged to be a T-shaped position-limit block composed of the position-limiting post 21 and the position-limiting ear 22, and the locking end of the fixing block 3 is tightly pressed by the position-limiting ear 22.

In order to improve the mounting convenience of the T-shaped structure of the position-limiting block 2, a position-limiting hole 33 is provided at the locking end of the fixing block 3 for limiting the position-limiting block 2 by clamp fitting. The press-fitting hole 31 and the position-limiting hole are in communication with each other through the mounting channel 32. The position-limiting block 2 is assembled at the torsion rod 71 of the torsion handle 7, when the pressing block 5 is tightly pressed onto the fixing block 3, the position-limiting block 2 sticks into the locking end of the fixing block 3 through the mounting channel 32. It should be understood that, the mounting channel 32 is a strip-shaped channel corresponding to the T-shaped structure of the position-limiting block 2, when the pressing block 5 and the fixing block 3 are tightly pressed, the position-limiting ear 22 of the position-limiting block 2 is twisted to a certain angle to abut against the locking end of the fixing block 3 by twisting the torsion handle 7, thus realizes the clamping of the pressing block 5 and the fixing block 3.

In the specific embodiment of the present application, a first end of the position-limiting post 21 is provided with a mounting hole of the torsion rod to connect to the torsion rod 71, and a second end of the position-limiting post 21 is provided with a locking bolt 1 connected to the torsion rod. The position-limiting block 2 and the torsion handle 7 are of a separated structure. The torsion handle 7 is connected to the position-limiting post 21 through the torsion rod 71. The first end of the position-limiting post 21 is provided with the mounting hole of the torsion rod. The mounting hole of the torsion rod is a through hole penetrating the position-limiting post 21 in an axial direction. The second end of the position-limiting post 21 is provided with a groove. An end portion, sticking into the mounting hole of the torsion rod, of the torsion rod 71 is provided with a screwed hole, and the position-limiting post 21 is fixedly connected to the torsion rod 71 by mounting the locking bolt 1 into the groove.

In the specific embodiment of the present application, a guide channel 53 arranged in the press-fitting direction of the pressing block is provided in the pressing block 5, the torsion rod 71 includes a first guide portion 711 and a second guide portion 712 having an inner diameter stepwise enlarged from the end portion to a root portion of the torsion rod, and the guide channel 53 includes a first guide hole 54 and a second guide hole configured for guiding the sliding of the first guide portion 711 and the second guide portion 712. The press-fitting spring 6 is sheathed on the first guide portion 711, and two ends of the press-fitting spring 6 abut against a hole side wall of the first guide hole 54 and the second guide portion 712 respectively.

The position-limiting block 2 is rotated from a mounting position to a certain angle by twisting the torsion handle 7, which allows the position-limiting ear 22 to be lapped on the locking end of the fixing block 3. When the connection module 4 is mounted between the pressing block 5 and the fixing block 3, the torsion rod 71 slides in the guide channel 53 and the position-limiting block 2 sticks out of the locking end of the fixing block 3 by pressing the torsion handle 7 in a pressing direction of the quick disassembly tool. Through a structure that the press-fitting spring 6 being sheathed on the torsion rod 7, the press-fitting spring 6 provides an elastic locking force for the pressing block 5 and the fixing block 3 in the press-fitting direction, and the connection of the pressing block 5 and the fixing block 3 can still be realized when the connection module 4 is not mounted, which avoids the loss of components and parts.

In the specific embodiment of the present application, an outer wall of the position-limiting post 21 is provided with a position-limiting groove 23 arranged circumferentially around the position-limiting post. The position-limiting groove 23 includes a position-limiting start point 231 where it is a start from a loading-in direction of the position-limiting block 2 and a position-limiting stop point 232 where it is an end in a rotationally locking direction. A press-fitting end face of the pressing block 5 is provided with a position-stopping post 55 protruding into the position-limiting groove 23.

The position-limiting block 2 is a T-shaped position-limiting structure composed of the position-limiting post 21 and the position-limiting ear 22. When the position-limiting block 2 is rotated to a certain angle driven by the rotation of the torsion handle 7, the position-limiting ear 22 of the position-limiting block 2 is lapped on the locking end of the fixing block 3. The outer wall of the position-limiting post 21 is provided with a position-limiting groove 23, a position-stopping post 55 protrudes from the press-fitting end face of the pressing block 5 to be clamped into the position-limiting groove 23. In the rotation of the torsion handle 7, the position-stopping post 55 abuts against and two side walls of the position-limiting groove 23 in a rotation direction of the position-limiting block 2, which allows the position-limiting block 2 to rotate from the position-limiting start point 231 starting from a loading-in position of the position-limiting block 2 to a preset angle, and a side wall of the position-limiting stop point 232 of the position-limiting groove 23 abuts against the position-stopping post 55, making the position-limiting ear 22 to be rotationally displaced with respect to the mounting channel at a loading-in position of the position-limiting ear 22, and the locking end of the fixing block 3 is position-limited through clamping by the position-limiting ear 22.

In the specific embodiment of the present application, an inner wall of the position-limiting groove 23 is provided with an anti-rebound position-limiting slot 24 near the position-limiting stop point 232 for clamping the position-stopping post 55. Since a certain angle of twisting displacement is generated between the position-limiting block 2 and the loading-in direction thereof through rotation, the position-limiting ear 22 of the position-limiting block 2 tightly clamps the locking end of the fixing block for position limiting, and due to the vibration during the vehicle running, the position-limiting block 2 will be driven to rotate in the pressing block 5 and the fixing block 3. In order to prevent the position-limiting ear 22 being detached from the fixing block 3 after free rotation, an anti-rebound position-limiting slot 24 is arranged at the position-limiting groove 23 of the position-stopping post 55, a thickness of the position-stopping post 55 may be arranged to be the same as a depth of the position-limiting groove 23, the depth of a position, near the position-limiting stop point 232, of the position-limiting groove 23 firstly shallows and then deepens, that is, a boss protruding from a surface of the position-limiting groove 23 is formed at the position, near the position-limiting stop point 232, of the position-limiting groove 23, so as to form the anti-rebound position-limiting slot 24 for clamping the position-stopping post 55. In the rotation of the torsion handle 7, the position-stopping post 55 is limited in the rotation direction by the boss of the anti-rebound position-limiting slot 24 of the position-limiting groove 23.

In the specific embodiment of the present application, a rotation angle between the position-limiting start point and the position-limiting stop point is in a range of 0~90°.

In the specific embodiment of the present application, a clearance between a root portion, located at the torsion rod, of the torsion handle and a locking end face of the pressing block is greater than 4 mm. The torsion rod 71 of the torsion handle 7 is sheathed with the press-fitting spring 6, it should be understood that, when the pressing block 5 and the fixing block 3 are tightly pressed and the connection module 4 is not connected, there is no clearance between the pressing block 5 and the fixing block 3. After the position-limiting block 2 is mounted in the fixing block 3 and the position-limiting block 2 and the fixing block 3 are locked by pressing the torsion handle 7, the press-fitting spring 6 jacks up the torsion handle 7, and the clearance between the root portion, connected to the torsion rod 71, of the torsion hand 7 and locking end face of the pressing block 5 is maximum.

When the connection module 4 is mounted between the pressing block 5 and the fixing block 3, a thickness of the fixing plate of the connection module 4 may be larger than 4 mm, that is, the position-limiting ear 22 of the position-limiting block 2 can stick out of the locking end of the fixing block 3 by pressing the torsion handle 7, so that the quick disassembly tool can fixedly mounting a connection piece having a thickness equal to or greater than 4 mm, thus a range of the thickness of the connection piece to be pressed is wide, which can adapt to more types of tools.

Based on the above description of the disclosed embodiments, those skilled in the art is capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A quick disassembly tool for fixedly mounting a connection module, the connection module comprising a fixing plate provided with a pressing opening, wherein the quick disassembly tool comprises a pressing block and a fixing block configured for press-fitting the connection module, wherein the fixing plate is press-connected between the pressing block and the fixing block;

the pressing block comprises a press-fitting post, a press-fitting end face of the fixing block is provided with a press-fitting hole, the press-fitting post is inserted into the press-fitting hole, and the press-fitting post is configured to cooperate with the pressing opening by insert fitting; and the quick disassembly tool further comprises a locking device respectively pressing on an end of the pressing block and an end of the fixing block, and the locking device comprises an elastic pressing device configured to adjust a press-fitting space between the pressing block and the fixing block;

the locking device comprises a torsion handle press-fitted on the end of the pressing block, and a torsion rod protruding from the press-fitting post is arranged on the torsion handle;

the end of the fixing block is provided with a position-limiting block fixedly connected with the torsion rod and pressing the fixing block tightly; and wherein the position-limiting block comprises a position-limiting post, a first end of the position-limiting post is provided with a mounting hole configured to be connected to the torsion rod, and a second end of the position-limiting post is provided with a locking bolt configured to be connected to the torsion rod.

2. The quick disassembly tool according to claim 1, wherein the pressing block further comprises a pressing disc lapped on the press-fitting end face of the fixing block, and the press-fitting post protrudes from a middle portion of the pressing disc.

3. The quick disassembly tool according to claim 2, wherein the torsion rod is sheathed with a press-fitting spring abutting against the pressing block or the fixing block.

4. The quick disassembly tool according to claim 3, wherein the position-limiting block further comprises a position-limiting ear extending in a radial direction of the position-limiting post, and a locking end of the fixing block is provided with a position-limiting hole rotationally cooperated with the position-limiting post;

a mounting channel in communication with both the press-fitting hole and the position-limiting hole is provided in the fixing block, and the mounting channel is configured to allow the position-limiting ear to pass through.

5. The quick disassembly tool according to claim 4, wherein an outer wall of the position-limiting post is provided with a position-limiting groove arranged circumferentially around the position-limiting post, the position-limiting groove comprises a position-limiting start point where it is a start in a loading-in direction of the position-limiting block and a position-limiting stop point where it is an end in a rotationally locking direction;

a press-fitting end face of the pressing block is provided with a position-stopping post protruding into the position-limiting groove.

6. The quick disassembly tool according to claim 5, wherein an inner wall of the position-limiting groove is provided with an anti-rebound position-limiting slot near the position-limiting stop point for clamping the position-stopping post.

7. The quick disassembly tool according to claim 6, wherein a rotation angle between the position-limiting start point and the position-limiting stop point is in a range of 0~90°.

8. The quick disassembly tool according to claim 3, wherein a guide channel arranged in a press-fitting direction of the pressing block is provided in the pressing block, the torsion rod comprises a first guide portion and a second guide portion having an inner diameter stepwise enlarged from an end portion to a root portion of the torsion rod, and the guide channel comprises a first guide hole and a second guide hole configured for guiding the sliding of the first guide portion and the second guide portion; the press-fitting spring is sheathed on the first guide portion, and two ends of the press-fitting spring abut against a hole side wall of the first guide hole and the second guide portion respectively.

9. The quick disassembly tool according to claim 8, wherein a clearance between a root portion, located at the torsion rod, of the torsion handle and a locking end face of the pressing block is larger than 4 mm.

* * * * *